(12) United States Patent
Ohara et al.

(10) Patent No.: US 8,508,609 B2
(45) Date of Patent: Aug. 13, 2013

(54) IMAGE PICKUP APPARATUS, IMAGING METHOD AND METHOD FOR CORRECTING INFRARED LIGHT

(75) Inventors: Naoto Ohara, Tokyo (JP); Yusuke Hayashi, Tokyo (JP); Tomoya Sugita, Tokyo (JP)

(73) Assignee: Kyocera Corporation, Kyoto (JP)

( * ) Notice: Subject to any disclaimer, the term of this patent is extended or adjusted under 35 U.S.C. 154(b) by 898 days.

(21) Appl. No.: 12/647,101

(22) Filed: Dec. 24, 2009

(65) Prior Publication Data

US 2010/0165110 A1   Jul. 1, 2010

(30) Foreign Application Priority Data

Dec. 25, 2008 (JP) ................................. 2008-331270

(51) Int. Cl.
*H04N 5/228* (2006.01)
*H04N 5/33* (2006.01)

(52) U.S. Cl.
USPC ..................... 348/222.1; 348/164; 348/229.1; 348/255; 348/280

(58) Field of Classification Search
USPC .................. 348/164, 222.1, 223.1, 280, 294, 348/229.1, 255
See application file for complete search history.

(56) References Cited

U.S. PATENT DOCUMENTS

| 6,211,521 | B1 * | 4/2001 | Bawolek et al. | 250/339.02 |
| 7,880,772 | B2 * | 2/2011 | Nagano et al. | 348/223.1 |
| 2007/0268377 | A1 * | 11/2007 | Nagano et al. | 348/222.1 |
| 2007/0285540 | A1 * | 12/2007 | Kwon et al. | 348/272 |
| 2008/0278592 | A1 * | 11/2008 | Kuno et al. | 348/222.1 |
| 2008/0316346 | A1 * | 12/2008 | Watanabe | 348/294 |
| 2009/0091647 | A1 * | 4/2009 | Hiromichi et al. | 348/294 |
| 2010/0283866 | A1 * | 11/2010 | Numata | 348/223.1 |

FOREIGN PATENT DOCUMENTS

JP   2006-94112   4/2006

* cited by examiner

*Primary Examiner* — Hung Lam
(74) *Attorney, Agent, or Firm* — Procopio, Cory, Hargreaves & Savitch LLP

(57) ABSTRACT

An image pickup device comprising visible color optimization under received near-infrared and infrared light conditions is disclosed. Color signals corresponding to light received through each of a plurality of color filters are processed to determine a near-infrared and infrared light energy contribution. The color signals are processed to optimize color of received images.

16 Claims, 20 Drawing Sheets

IMAGE PICKUP APPARATUS, IMAGING METHOD AND METHOD FOR CORRECTING INFRARED LIGHT

CROSS-REFERENCE TO RELATED APPLICATION

The present application claims priority under 35 U.S.C. §119 to Japanese Application No. 2008-331270, filed on Dec. 25, 2008, entitled "IMAGE PICKUP APPARATUS AND METHOD FOR PICKING UP IMAGES". The content of which is incorporated by reference herein in its entirety.

FIELD

Embodiments of the present invention relate generally to image pickup devices, and more particularly relate to an image pickup device comprising solid-state image pickup devices.

BACKGROUND

Some mobile information devices can capture images. Such mobile information devices may comprise image pickup devices, such as Complementary Metal Oxide Semiconductor (CMOS) sensors, Charge Coupled Devices (CCD), and the like as an image pickup device. In the image pickup device, when three primary colors such as red (R), green (G), and blue (B) are obtained, light is transmitted through color separation filters having optical bands corresponding to R, G, and B. The color separation filters comprise a dye or a pigment, and a target color is transmitted through a corresponding color separation filter. However, the color separation filters transmit light in an infrared region and at a constant rate while transmitting the target color.

Human visual sensory systems have a sensitivity characteristic to colors of about 380 nm to about 780 nm, which is called a visible region. A near-infrared region has a wavelength of about 780 nm to about 2500 nm, and an infrared region has a wavelength of about 2500 nm or more. Although rays of light may not be directly seen by a naked eye, the rays of light can be seen by a monitor of a digital camera or a video camera comprising an image pickup device. In order to match a sensitivity characteristic of the image pickup device with that of human eyes, sometimes an image pickup device comprises an Infrared Ray Cut Filter (IRCF). The IRCF generally cuts the rays in the infrared and near-infrared regions.

The IRCF may reduce color distortion by blocking absorption of the infrared light from the image pickup device. Blocking absorption of the infrared light from the image pickup device allows the image pickup device to optimize reception for visible light. However, during low light conditions lack of energy from the infrared light may reduce total light energy received by the image pickup device below a useful threshold for image reception. Therefore, there is a need for improving color reproducibility of an image pickup device during high light level and low light level conditions.

SUMMARY

An image pickup device comprising visible color optimization under received near-infrared and infrared light conditions is disclosed. Color signals corresponding to light received through each of a plurality of color filters are processed to determine a near-infrared and infrared light energy contribution. The color signals are processed to optimize color of received images.

A first embodiment comprises an image pickup apparatus. The image pickup apparatus comprises a group of color filters comprising a plurality of colors. The group of color filters comprising a first color filter comprising a first color having a first spectral characteristic. The image pickup apparatus further comprises an image pickup device operable to output a plurality of color signals corresponding to light transmitted through each of the color filters respectively. The color signals comprise a first color signal corresponding to the first color filter. The image pickup apparatus also comprises a color processing unit. The color processing unit is operable to combine the color signals excluding the first color signal to obtain a second color signal having a second spectral characteristic substantially equal to the first spectral characteristic in a visible region. The color processing unit is also operable to compare the first color signal to the second color signal to obtain incident light quantities in near-infrared and infrared regions.

A second embodiment comprises a method for correcting infrared light. The method comprises generating a first color signal corresponding to light received through a first color filter. The first color signal has a first spectral characteristic. The method further comprises computing a second color signal by combining color signals of light transmitted through at least two color filters which are different from the first color filter. The method also comprises performing correction to the second color signal to obtain a corrected second color signal having a second spectral characteristic substantially equal to the first spectral characteristic in a visible region. The method also comprises estimating an incident light quantity in an infrared region by comparing the first color signal and the corrected second color signal.

A third embodiment comprises an imaging method. The imaging method comprises receiving a plurality of light rays transmitted through a group of color filters comprising a first color filter of a first color having a first spectral characteristic. The imaging method further comprises generating a plurality of color signals corresponding to the light rays transmitted respectively. The color signals comprising a first color signal corresponding to a first light ray transmitted through the first color filter. The imaging method also comprises computing a second color signal by combining at least two color signals corresponding to light rays transmitted through at least two color filters that are different from the first color filter. The imaging method also comprises performing correction to the second color signal to obtain a corrected second color having a second spectral characteristic substantially equal to the first spectral characteristic in a visible region. The imaging method also comprises estimating incident light quantities in near-infrared and infrared regions by comparing the first color signal and the corrected second color signal.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the embodiments without limiting the breadth, scope, scale, or applicability of the invention. The drawings are not necessarily made to scale.

DETAILED DESCRIPTION

The following detailed description is exemplary in nature and is not intended to limit the invention or the application and uses of the embodiments of the present invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

The following description is presented to enable a person of ordinary skill in the art to make and use the embodiments of the present invention. The following detailed description is exemplary in nature and is not intended to limit the invention or the application and uses of the embodiments of the present invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the present invention are described herein in the context of one practical non-limiting application, namely, a mobile terminal with a digital camera. Embodiments of the present invention, however, are not limited to such mobile terminal applications such as cell phones, PDA (personal digital assistance) and the like, and the techniques described herein may also be utilized in other applications of optical systems. For example, embodiments may be applicable to digital cameras, personal computers, and the like.

As would be apparent to one of ordinary skill in the art after reading this description, these are merely examples and the embodiments of the present invention are not limited to operating in accordance with these examples. Other embodiments may be utilized and structural changes may be made without departing from the scope of the exemplary embodiments of the present invention.

Figure 1:
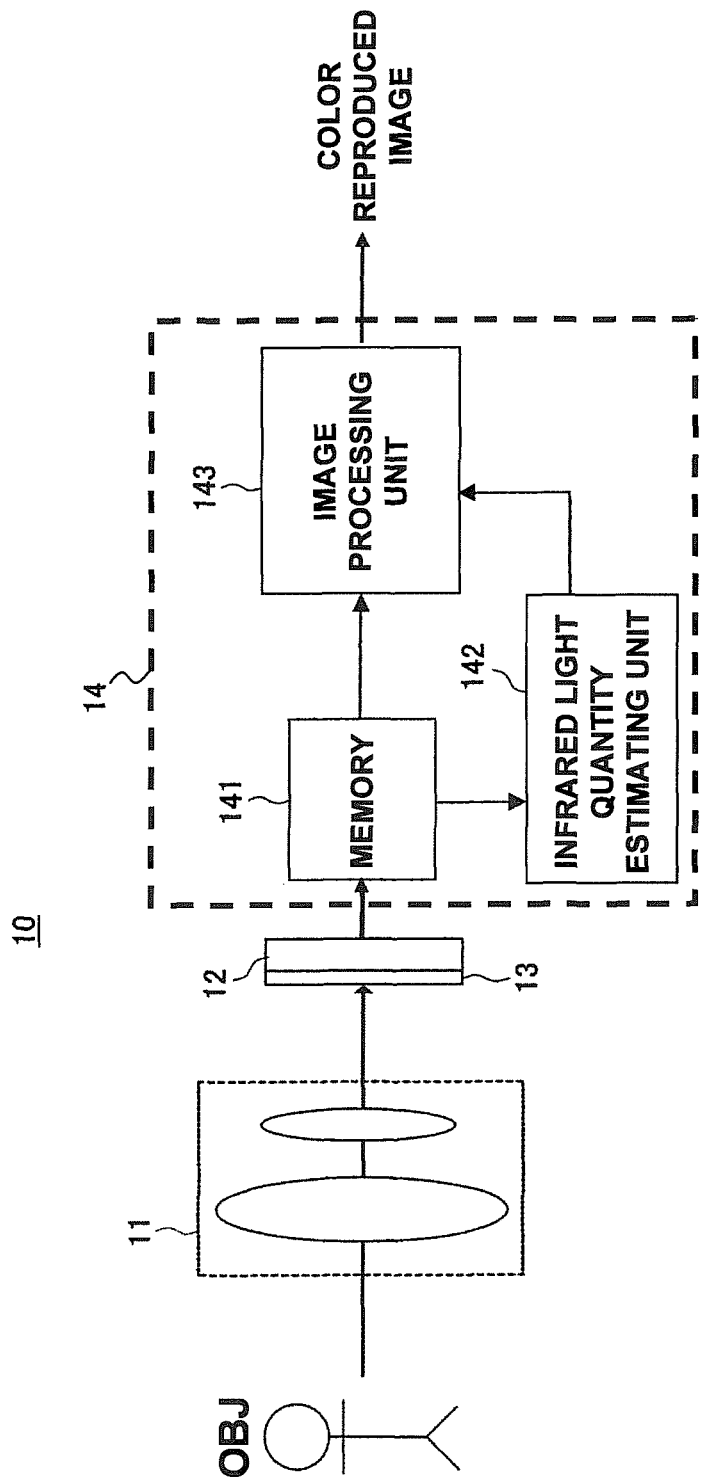
FIG. 1 is an illustration of a block diagram of an exemplary configuration of an image pickup apparatus according to an embodiment of the present invention.

FIG. 1 is an illustration of a block diagram of an exemplary configuration of an image pickup apparatus according to an embodiment of the present invention. The image pickup apparatus 10 comprises a lens system (i.e., an optical system) 11, an image pickup device 12, a group of color filters 13 and a color processing unit 14.

The lens system 11 forms an image of an object OBJ onto an imaging surface of the image pickup device 12 through the group of color filters 13.

The image pickup device 12 may, for example and without limitation, be a semiconductor sensor such as a CCD sensor, a CMOS sensor, and the like. In an embodiment, the image pickup device 12 may comprise a plurality of pixels arranged in a matrix. The image pickup device 12 produces an analog color signal corresponding to light transmitted through each color filter of the group of color filters 13. The produced analog color signal may be converted into a digital color signal which may be sent to the color processing unit 14.

The group of color filters 13 comprises color filters of various colors. The group of color filters 13 may have four or more color filters corresponding to visible light. In one embodiment, the group of color filters 13 may comprise color filters of four colors. The group of color filters 13 is located on a light incident side of the imaging surface of the image pickup device 12.

Figure 2:
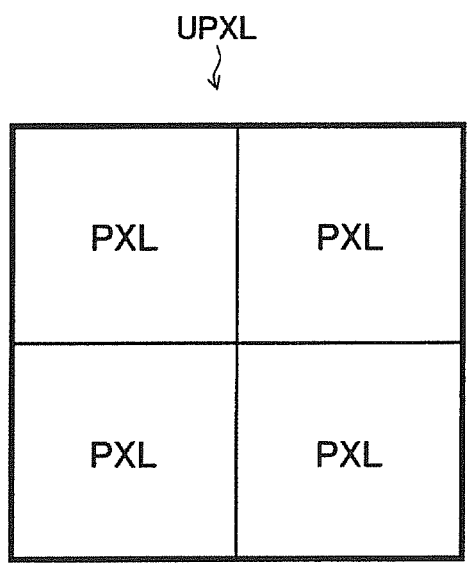
FIG. 2 is an illustration of a unit pixel.

FIG. 2 is an illustration of a unit pixel UPXL. As illustrated in FIG. 2, the image pickup device 12 may comprise four pixels PXL in which unit pixels UPXL are arrayed into a 2-by-2 matrix shape forming a pixel array of the image pickup device 12.

Figure 3:
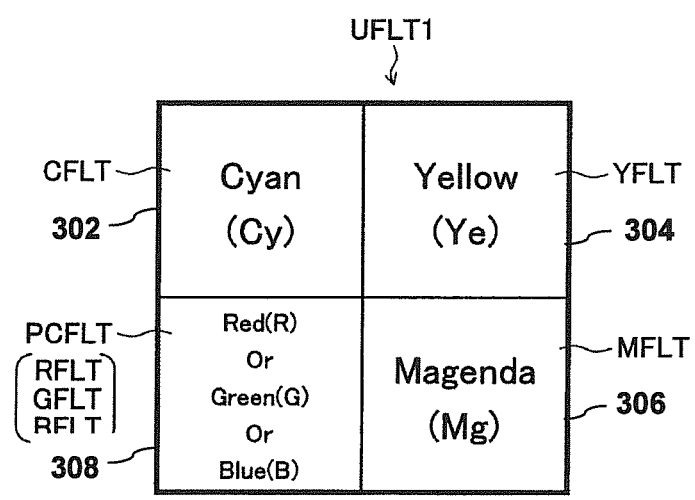
FIG. 3 is an illustration of an exemplary arrangement of a unit filter comprising color filters of four colors according to an embodiment of the present invention.

FIG. 3 is an illustration of an exemplary arrangement of a unit filter UFLT1 comprising color filters of four colors according to an embodiment of the present invention. The unit filter UFLT1 comprises a 2-by-2 matrix comprising the color filters of four colors arrayed corresponding to the unit pixel UPXL of FIG. 2. The unit filter UFLT1 comprises a Cyan (Cy) filter CFLT, a Yellow (Ye) filter YFLT, and a Yellow (Ye) filter YFLT, a Magenta (Mg) filter MFLT, transmitting the complementary colors (transmitted complementary colors) Cy, Ye, and Mg shown in pixels 302, 304, and 306 respectively. The unit filter UFLT1 also comprises a primary color filter PCFLT comprising one of primary colors, Red (R), Green (G), or Blue (B) shown in pixel 308. Each of the primary colors may be an obtained (computed primary color) using at least two colors from the transmitted complementary colors Cy, Ye, and Mg.

The color processing unit 14 can combine various transmitted complementary color signals transmitted through color filters CFLT, YFLT and MFLT. The color processing unit 14 may obtain a color signal of a computed primary color that has a spectral characteristic equal to that of the transmitted primary color in the visible region. Then the color processing unit 14 compares the color signal of the primary color transmitted through the primary color filter PCFLT with the color signal of the computed primary color to obtain light quantities in near-infrared and infrared regions.

Figure 4:
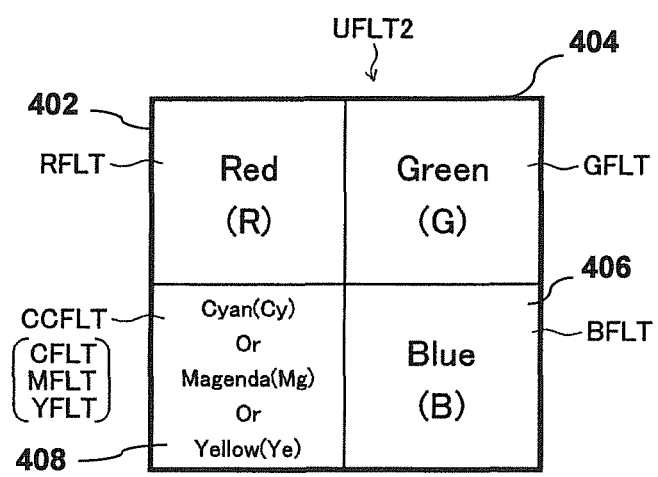
FIG. 4 is an illustration of an exemplary arrangement of a unit filter comprising color filters of four colors according to an embodiment of the present invention.

FIG. 4 is an illustration of an exemplary arrangement of a unit filter UFLT2 comprising color filters of four colors according to an embodiment of the present invention. The unit filter UFLT2 comprises the color filters of four colors arrayed into the 2-by-2 matrix corresponding to the unit pixel UPXL of FIG. 2. The unit filter UFLT2 comprises a Red (R) filter RFLT, a Green (G) filter GFLT, and a Blue (B) filter BFLT, transmitting the primary colors Red (R), Green (G), and Blue (B) (transmitted primary colors) shown in pixels 402, 404, and 406 respectively.

The unit filter UFLT2 also comprises a complementary color filter CCFLT comprising one of the complementary colors such as Cyan (Cy), Magenta (Mg), and Yellow (Ye) shown in pixel 408. Each of the complementary colors may be obtained (computed complementary color) using at least two colors from the transmitted primary colors Red (R), Green (G), or Blue (B).

The color processing unit 14 can combine various transmitted primary color signals transmitted through color filters RFTL, GFLT and BFLT. The color processing unit 14 may obtain a color signal of the computed complementary color that has a spectral characteristic equal to that of the transmitted complementary color in the visible region. Then the color processing unit 14 compares the color signal of a transmitted complementary color transmitted through the complementary color filter CCFLT with the color signal of the computed complementary color to obtain light quantities in near-infrared and infrared regions.

For example, the color processing unit 14 obtains the light quantities (or infrared light quantities) in the near-infrared and infrared spectrums by a difference (i.e., CC1−CC2 or CC2−CC1) or a ratio (i.e., CC1/CC2 or CC2/CC1) between a component CC1 of the transmitted primary color or transmitted complementary color and a component CC2 of the computed primary color or computed complimentary color, respectively.

The color processing unit 14 can adjust a gain such that the color signal of the transmitted primary color and the computed primary color are substantially matched with each other in a luminosity region or the visible region, and that the color signal of the transmitted complimentary color and the computed complimentary color are substantially matched with each other in a luminosity region or the visible region.

In the image pickup apparatus 10, because the signal whose gain is adjusted as mentioned above comprises a signal out of the luminosity region or the visible region, an output value of a color signal of the transmitted primary color and the transmitted complimentary color differs from an output value of a color signal of the computed primary color or the computed complimentary color respectively.

The transmitted primary color means a filter color of the primary color, such as Green (G) when the filter UFLT1 of FIG. 3 is used. The transmitted complimentary color means a filter color of the complementary color, such as Magenta (Mg) when the filter UFLT2 of FIG. 4 is used. In this document, the transmitted primary color or the transmitted complementary color may be referred to as a first color.

The computed primary color is generated by combining at least two transmitted color signals transmitted through the cyan filter CFLT, the magenta filter MFLT, and the yellow filter YFLT when the unit filter UFLT1 of FIG. 3 is used. The computed complimentary color is generated by combining at least two transmitted color signals transmitted through the red filter RFLT, the green filter GFLT, and the blue filter BFLT when the unit filter UFLT2 of FIG. 4 is used. In this document, the computed primary color or the computed complementary color may be referred to as a second color.

The color processing unit 14 comprises a memory 141, an infrared light quantity (IR) estimating unit 142 in near-infrared and infrared regions, and an image processing unit 143.

The memory 141 retains the digital color signal of the image pickup device 12, and the memory 141 supplies data of the digital color signal to the infrared light quantity estimating unit 142 and the image processing unit 143.

A color correction coefficient corresponding to an infrared light quantity computed from the color signal is stored in the memory 141. The memory 141 supplies the color correction coefficient to the image processing unit 143.

The infrared light quantity estimating unit 142 compares the color signal of a light transmitted through the color filter of the transmitted primary color, or transmitted through the color filter of the transmitted complimentary color with the color signal of the computed primary color or the computed complimentary color, respectively to estimate the incident light quantities in the near-infrared and infrared spectrums. For example, as mentioned above the incident light quantities in the near-infrared and infrared spectrums can be estimated by the difference or ratio between the transmitted primary color component and the computed primary color component, or between the transmitted complimentary color component and the computed complimentary color component. In this document, the color signal transmitted through the color filter of the transmitted primary color, or the color signal transmitted through the color filter of transmitted complimentary color may be referred to as a first color signal. Similarly, the color signal of the computed primary color, or the color signal of the computed complimentary color may be referred to as a second color signal.

The infrared light quantity estimating unit 142 computes the infrared light quantity correction amount to realize proper color reproduction through the estimation processing, and the infrared light quantity estimating unit 142 sends the result to the image processing unit 143.

The image processing unit 143 receives the correction amount from the infrared light quantity estimating unit 142, the image processing unit 143 reads the color correction coefficient corresponding to the correction amount from the memory 141, and the image processing unit 143 performs color correction processing to the original image using the read color correction coefficient.

The image pickup apparatus 10 comprises the color filters of, for example and without limitation, four colors, and compares a color signal of the second color that is computed from at least two colors by the color processing unit 14 and the color signal of the first color that is transmitted through the color filter having a wavelength region substantially equal to that of the computed signal (the second signal).

The color processing unit 14 determines that the amount of infrared signal is large when the difference between a signal of the first color and a signal of the second color is large in the near-infrared and infrared regions. The color processing unit 14 also recognizes that the amount of infrared signal is not large when the difference between the first signal and the second signal is small in the near-infrared and infrared regions.

The infrared light quantity estimating unit 142 feeds the estimation result of the infrared light quantity back to a color correction processing system of the image of the image processing unit 143. For example, when the group of color filters of FIG. 3 is used, the image pickup apparatus 10 compares the computed primary color such as a green component (second color) that is computed from the color signals transmitted through the Cyan (Cy), Magenta (Mg), and Yellow (Ye) color filters in the complementary color filters, with the transmitted primary color such as a green component (first color) transmitted through the green filter GFLT, thereby estimating the infrared light quantity of the incident light.

The color reproducibility can be improved by performing the feedback to the color correction based on the estimated infrared light quantity. The color reproduction processing as well as a filter characteristic and a principle of the infrared light quantity estimation in the image pickup apparatus 10 of an embodiment will be described more specifically with reference to FIGS. 5 to 16.

Figure 5:
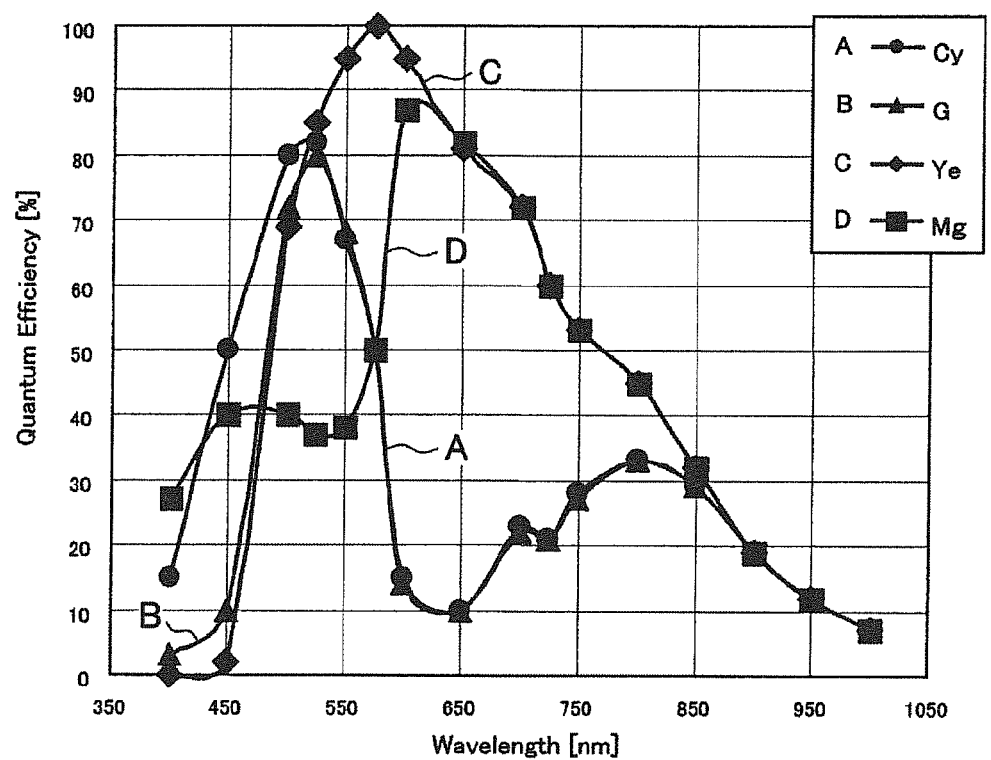
FIG. 5 is an illustration of an exemplary graph showing spectral sensitivity characteristic of an image pickup device on which the unit filter of complementary colors (cyan, magenta, yellow, and green) of FIG. 3 is mounted.

FIG. 5 is an illustration of an exemplary graph showing spectral sensitivity characteristic of an image pickup device on which the unit filter of complementary colors (cyan, magenta, yellow, and green) of FIG. 3 is mounted. Cy (Cyan) designated by the letter A in the graph has a peak near 500 nm because Cy is a mixed color of blue and green, and Cy has a high quantum conversion efficiency in a range of 400 nm to 500 nm compared with G (Green) designated by the letter B in the graph. Ye (Yellow) designated by the letter C in the graph has a peak near 600 nm because Ye is a mixed color of red and green. Because Mg (Magenta) designated by the letter D in the graph is a mixed color of red and blue, the color mixing is performed by wavelengths different from each other, and Mg has two peaks.

Figure 6:
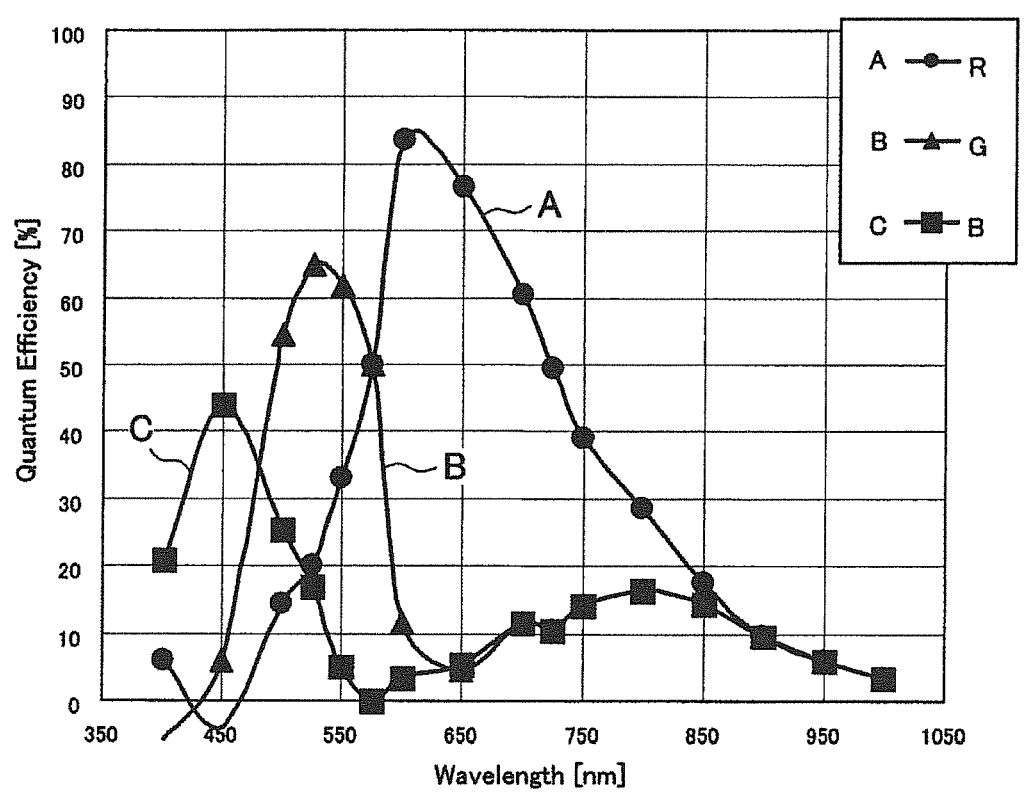
FIG. 6 is an illustration of an exemplary graph showing spectral sensitivity characteristic of an image pickup device on which the unit filter of the primary colors (red, blue, and two green filters) of FIG. 4 is mounted.

FIG. 6 is an illustration of an exemplary graph showing a spectral characteristic of an image pickup device on which the unit filter of the primary colors (i.e., red, blue, and two green filters) of FIG. 4 is mounted. The complementary color filter of FIG. 3 is the color mixing filter of the three primary colors. On the other hand, because the primary color filter is formed by the three primary colors, advantageously a steep peak is obtained in each filter, and the primary color filter has good color reproducibility. The reason why the primary color filter has the two green filters is that the peak of sensitivity (i.e., luminosity factor) of a human eye exists in green.

The infrared ray is generally cut according to the human luminosity characteristic when the image pickup device is actually used in a digital still camera. An infrared ray cut filter IRCF is used to cut the infrared ray.

In FIGS. 5 and 6, a horizontal axis indicates a wavelength, and a vertical axis indicates quantum efficiency. In FIG. 5, a curve A shows a spectral characteristic of the cyan filter CFLT, a curve B shows a spectral characteristic of the green filter GFLT, a curve C shows a spectral characteristic of the yellow filter YFLT, and a curve D shows a spectral characteristic of the magenta filter MFLT. In FIG. 6, a curve A shows a spectral characteristic of the red filter RFLT, a curve B shows a spectral characteristic of the green filter GFLT, and a curve C shows a spectral characteristic of the blue filter BFLT.

As illustrated in FIGS. 5 and 6, the use of the complementary color filter shows better quantum efficiency than the use of the primary color filter. This is because the image pickup device has a sensitivity characteristic as the human has the luminosity characteristic. In the image pickup device (monochrome) on which no color filter is mounted, quantum conversion efficiency of red is higher than blue. As can be seen from FIG. 6, the quantum conversion efficiency of the curve A (red) is higher than the curve C (blue). Therefore, in the complementary color filter, magenta is formed by mixing red in blue having the low quantum conversion efficiency, and cyan is formed by mixing green in blue, thereby enhancing the sensitivity.

Figure 7:
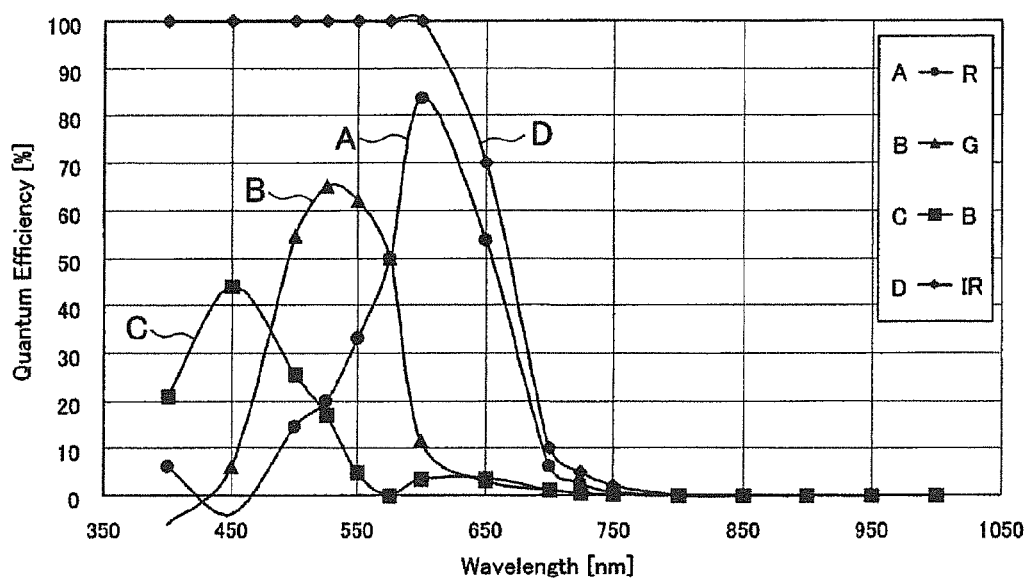
FIG. 7 is an illustration of an exemplary graph showing spectral transmittance characteristic in which the infrared ray cut filter IRCF is added to the image pickup device on which the primary color filter is mounted.

FIG. 7 is an illustration of an exemplary graph showing a spectral transmittance characteristic in which the infrared ray cut filter IRCF is added to the image pickup device on which the primary color filter is mounted. In FIG. 7, a horizontal axis indicates a wavelength, and a vertical axis indicates quantum efficiency. A curve A shows a spectral transmittance characteristic of the red filter RFLT, a curve B shows a spectral transmittance characteristic of the green filter GFLT, a curve C shows a spectral transmittance characteristic of the blue filter BFLT, and a curve D shows a spectral transmittance characteristic of the infrared ray cut filter IRCF.

The infrared ray cut filter IRCF sufficiently exerts a blocking effect in a wavelength region of about 700 nm or above. The infrared ray cut filter IRCF is mounted for adapting the image pickup apparatus 10 to the human luminosity characteristic. Unless the infrared ray cut filter IRCF is mounted, because the image pickup device 12 senses the light in the infrared region (about 800 nm) that is invisible to the human eye, the image of the object OBJ is different from the image that is visible to the human eye. The spectral transmittance characteristic of FIG. 7 differs from the spectral transmittance characteristic of FIG. 6 in the wavelength region of 700 nm or above. For an ultraviolet region, because the luminosity factor is substantially equal to the spectral characteristic of the image pickup device, the ultraviolet cut filter is not particularly provided.

Figure 8:
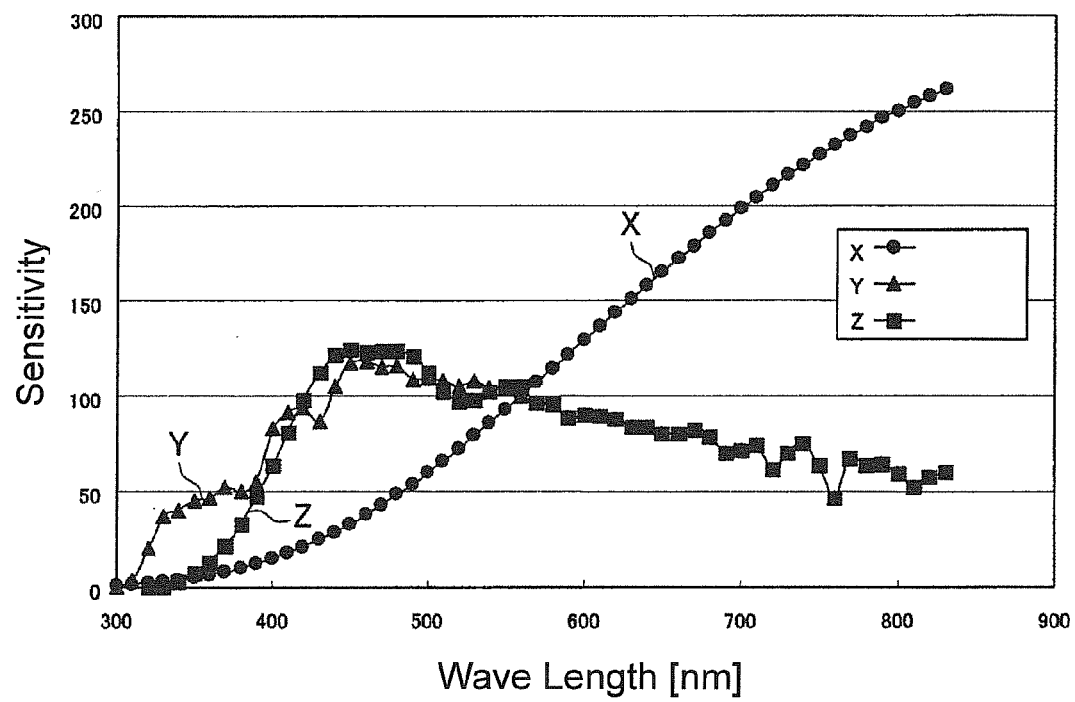
FIG. 8 is an illustration of an exemplary graph showing sensitivity distributions of a first light source, a second light source, and a third light source.

FIG. 8 is an illustration of an exemplary graph showing sensitivity distributions of a first light source, a second light source, and a third light source. A horizontal axis indicates a wavelength, and a vertical axis indicates sensitivity. A curve X is a spectral distribution characteristic of a first light source or an A light source in ISO-CIE standard, a curve Y is a spectral distribution characteristic of a second light source of a D65 light source in ISO-CIE standard, and a curve Z is a spectral distribution characteristic of a third light source or a C light source in ISO-CIE standard.

The first light source has a color temperature of about 2850 degrees K that is substantially equal to that of a household electric bulb. The second light source has a color temperature of about 6500 degrees K. The color temperature of the third light source is close to daylight and that of the second light source is closer to daylight compared with the C light source.

Figure 9:
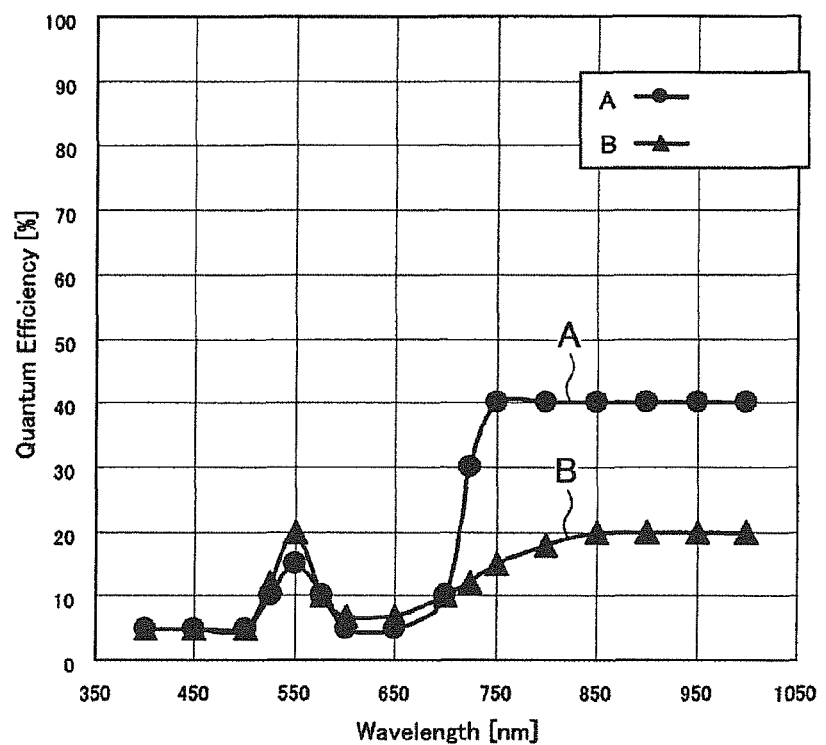
FIG. 9 is an illustration of an exemplary graph showing spectral reflection factors of colors of a natural leaf and an artificial plant (leaf).

FIG. 9 is an illustration of an exemplary graph showing spectral reflection factors of colors of a natural leaf and an artificial plant (i.e., leaf) as an example for explaining that an object visible to the human is different from an object visible to the image pickup device. In practice, the example of FIG. 9 is not limited to the leaf. For example, although black of a nylon cloth, black paper, and cotton dyed in black are visible to the human eye as the same black, the black of a nylon cloth, black paper, and cotton dyed in black are not visible to the image pickup device as the same black.

In FIG. 9, a horizontal axis indicates a wavelength, and a vertical axis indicates quantum efficiency. In FIG. 9, a curve A is a reflectivity characteristic of a natural leaf, and a curve B is a reflectivity characteristic of an artificial plant. As can be seen from FIG. 9, the infrared light reflected by the natural leaf is larger than the infrared light reflected by the artificial plant.

Human visual sensory systems may not distinguish the reflectivity characteristic results of the natural leaf and the artificial plant from each other. The natural leaf and the artificial plant are visible to the human eye as the same object because the human cannot identify the wavelength region of about 650 nm or above. On the other hand, the image pickup device can identify the wavelength region of 650 nm or above, and the natural leaf receives more light than the artificial plant does. Therefore, the natural leaf is brighter than the artificial plant in the image pickup device.

Figure 10:
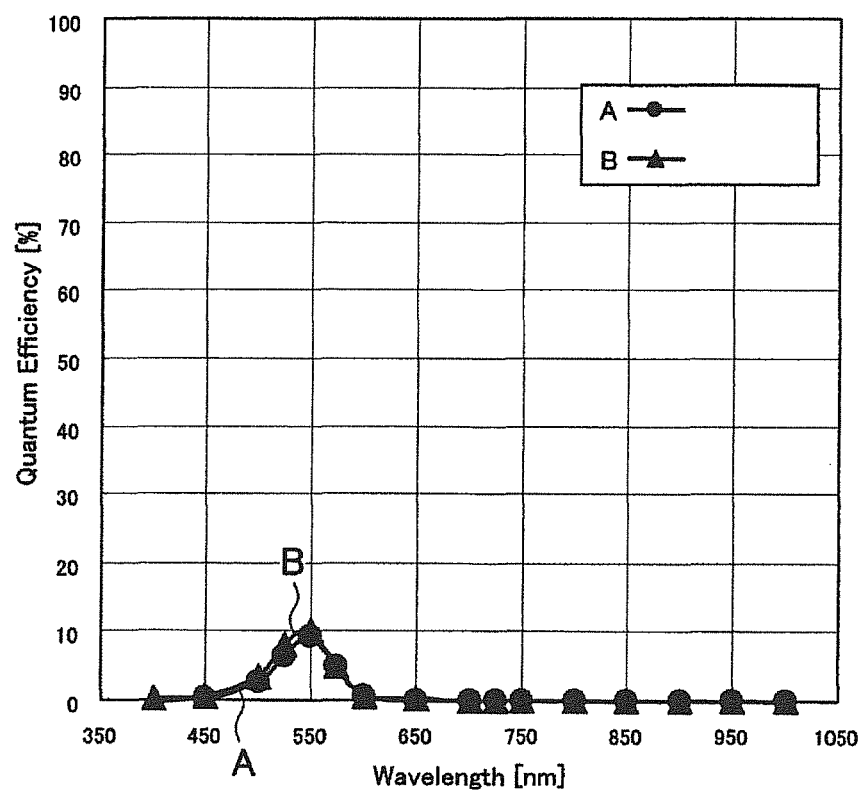
FIG. 10 is an illustration of an exemplary graph showing spectral characteristic when the natural leaf and the artificial leaf are taken with the image pickup device comprising the infrared ray cut filter IRCF.

FIG. 10 is an illustration of an exemplary graph showing a spectral characteristic when the natural leaf and the artificial leaf are taken with the image pickup device having the infrared ray cut filter IRCF according to an embodiment of the present invention. A horizontal axis indicates a wavelength, and a vertical axis indicates quantum efficiency. A curve A is a reflectivity characteristic of a natural leaf, and a curve B is a reflectivity characteristic of an artificial plant.

As illustrated in FIG. 10, because the infrared component is cut by the infrared ray cut filter IRCF, the natural leaf and the artificial plant are taken as the same green. The infrared ray cut filter IRCF is mounted such that the object is taken as the image identical to that of the human eye when the digital still camera is used. As illustrated in FIG. 10, because the infrared component is cut by the infrared ray cut filter IRCF, the natural leaf and the artificial plant are taken as the same green. This is because the colors are expressed within the human visual sensory system luminosity region (human luminosity region).

Figure 11:
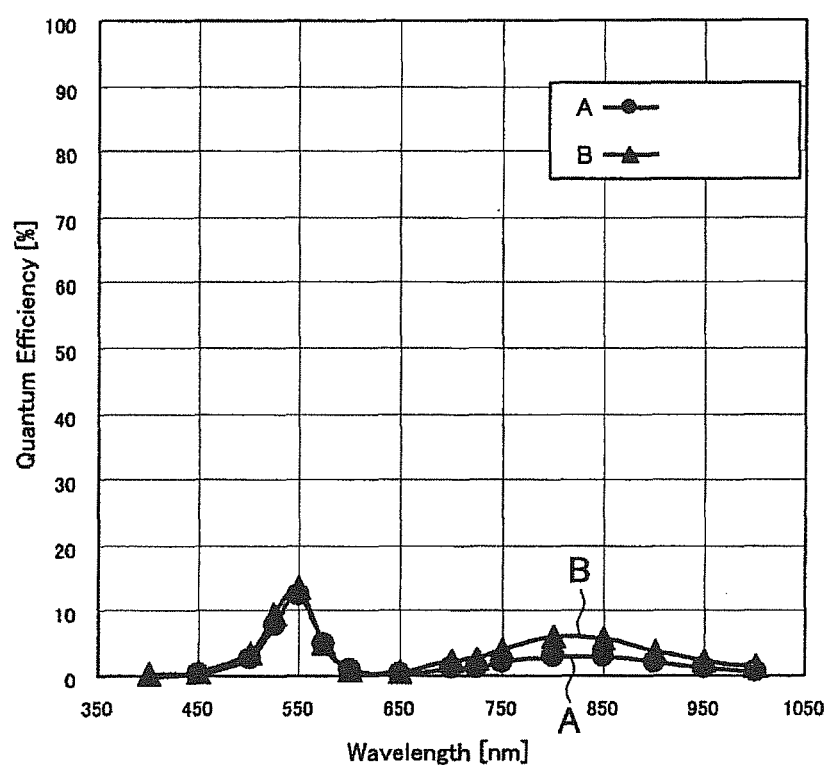
FIG. 11 is an illustration of an exemplary graph showing spectral characteristic when the natural leaf and the artificial leaf are taken with the image pickup device that does not comprise the infrared ray cut filter IRCF.

FIG. 11 is an illustration of an exemplary graph showing a spectral characteristic when the natural leaf and the artificial leaf are taken with the image pickup device that does not comprise the infrared ray cut filter IRCF. FIG. 11 illustrates the result in which the quantum efficiency showed in FIG. 9 and the quantum efficiency showed in FIG. 6 are multiplied together in each wavelength. In FIG. 11, a horizontal axis indicates a wavelength, and a vertical axis indicates quantum efficiency. A curve A is a reflectivity characteristic of a natural leaf, and a curve B is a reflectivity characteristic of an artificial plant. FIG. 11 illustrates that the image pickup device receives the reflected light up to the infrared light out of the human luminosity region because of the absence of the infrared ray cut filter IRCF.

Therefore, when the infrared ray cut filter IRCF is removed, different colors are outputted between the artificial leaf (i.e., plant) and the natural leaf. In this manner, the artificial leaf and the natural leaf are visible to the human eye as the same color because the human does not have the sensitivity in the infrared region.

Figure 12A:
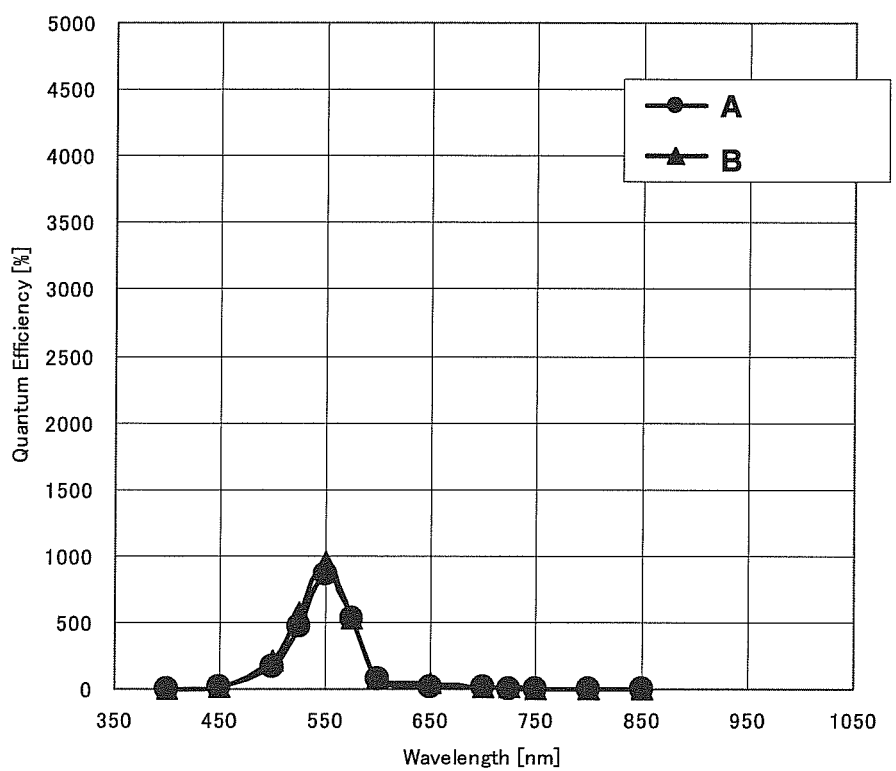
FIGS. 12A to 12C are illustrations of exemplary graphs showing spectral characteristics when the light emitted each light source having the characteristic of FIG. 8 is transmitted while the infrared ray cut filter IRCF is mounted.
Figure 12B:
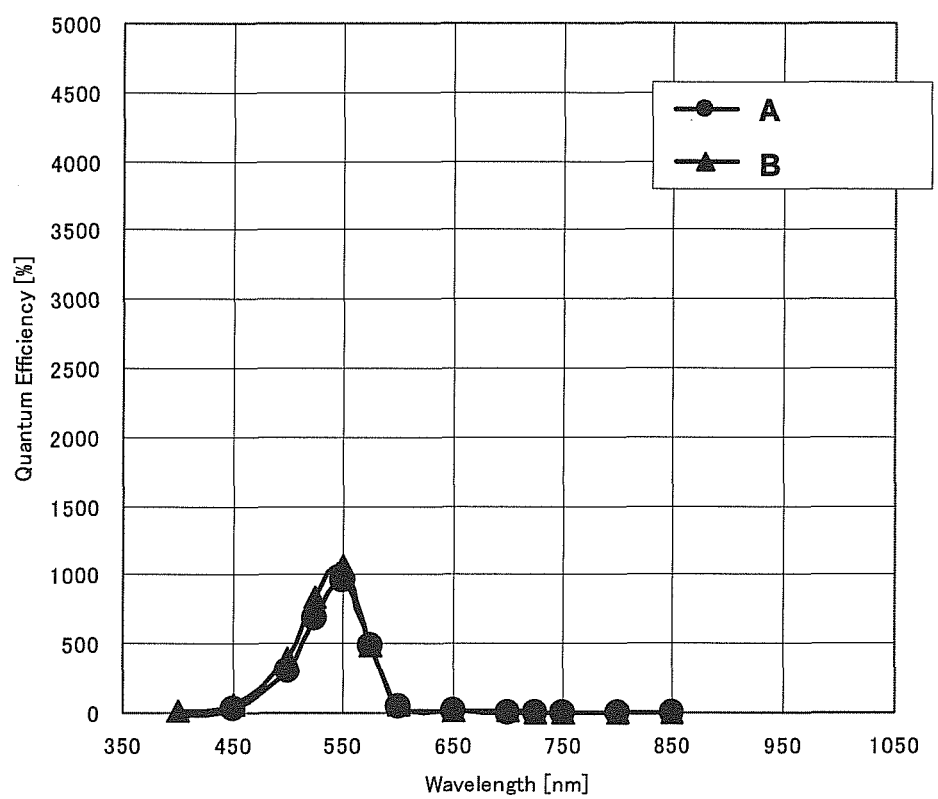
Figure 12C:
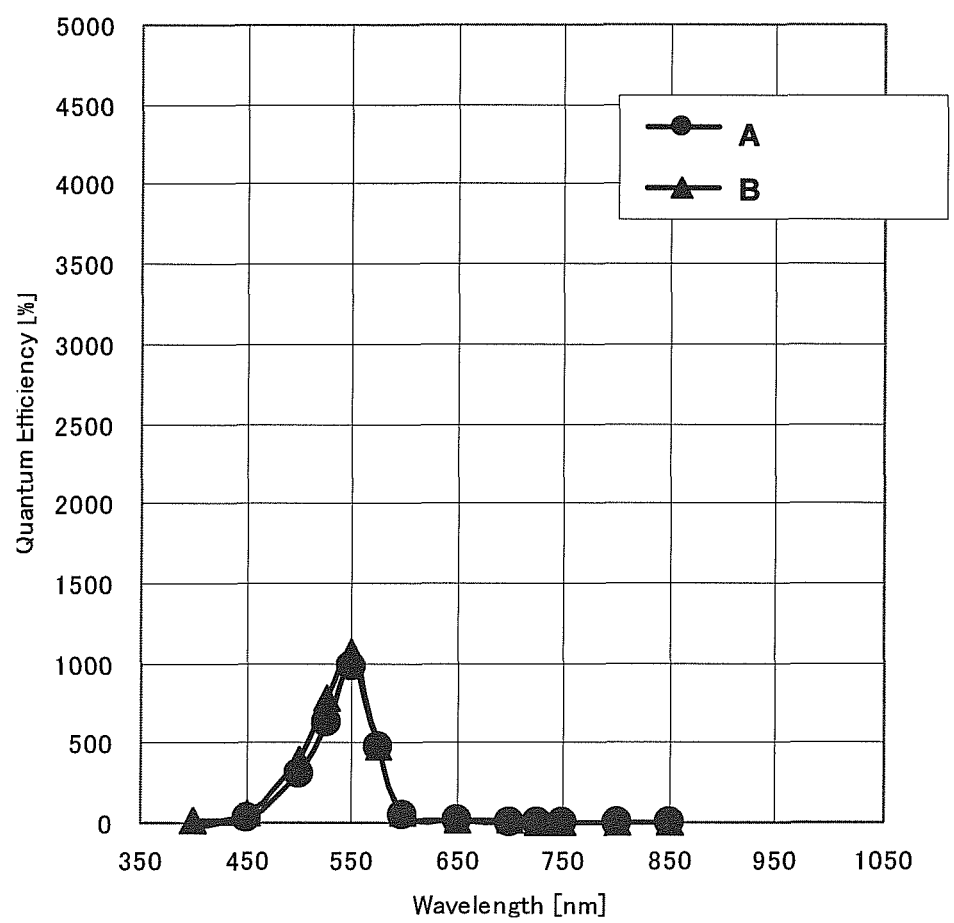

FIG. 12A are illustrations of exemplary graphs showing spectral characteristics of the natural leaf and the artificial plant when the light emitted from the first light source is transmitted while the infrared ray cut filter IRCF is mounted according to an embodiment of the present invention. FIG. 12B illustrates spectral characteristics of the natural leaf and the artificial plant when the light emitted from the second light source is transmitted while the infrared ray cut filter IRCF is mounted. FIG. 12C illustrates spectral characteristics of the natural leaf and the artificial plant when the light emitted from the third light source is transmitted while the infrared ray cut filter IRCF is mounted.

The spectral characteristic results of FIGS. 12A to 12C are obtained by multiplying the leaf characteristic of FIG. 9, the light source characteristic of FIG. 8, and D (IRCF characteristic) of FIG. 7. The first light source emits light including a large amount of a component in the infrared region, and the second light source emits light whose component in the infrared region is smaller than that of the first light source.

In FIGS. 12A to 12C, a horizontal axis indicates a wavelength, and a vertical axis indicates quantum efficiency. As illustrated in FIGS. 12A to 12C, although the amount of the infrared ray vary depending on the light source, the same object as seen by the human eye can be seen by the image pickup device including the infrared ray cut filter IRCF because the infrared light is cut by the infrared ray cut filter IRCF.

Figure 13A:
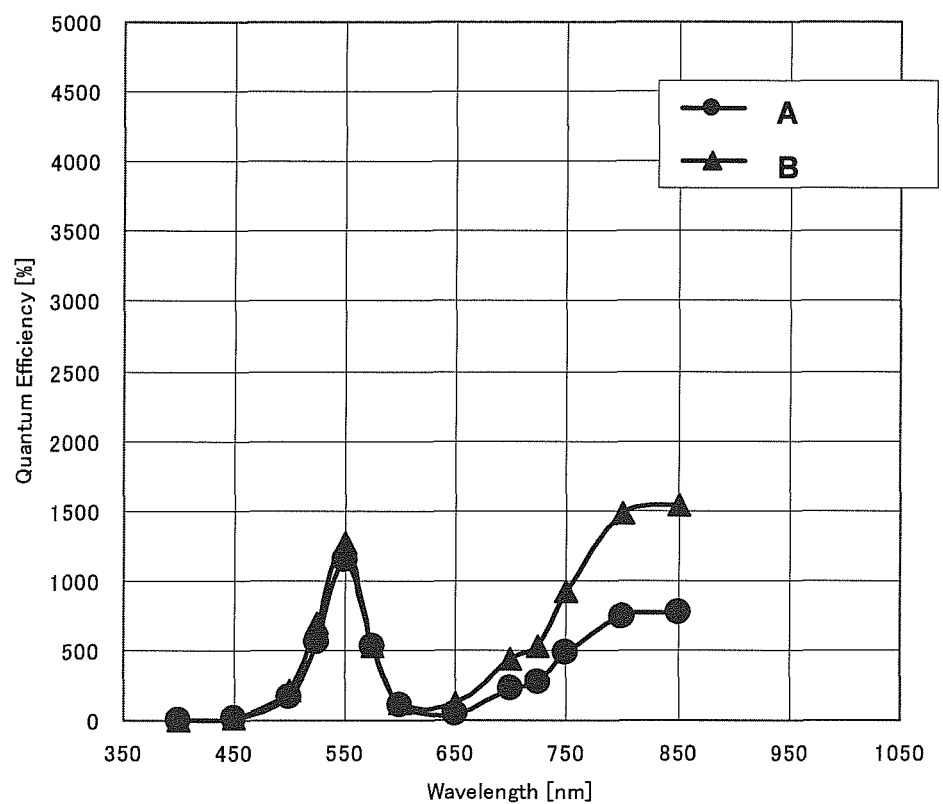
FIGS. 13A to 13C are illustrations of exemplary graphs showing spectral characteristics when the light emitted from each light source having the characteristic of FIG. 8 is transmitted while the infrared ray cut filter IRCF is not mounted.
Figure 13B:
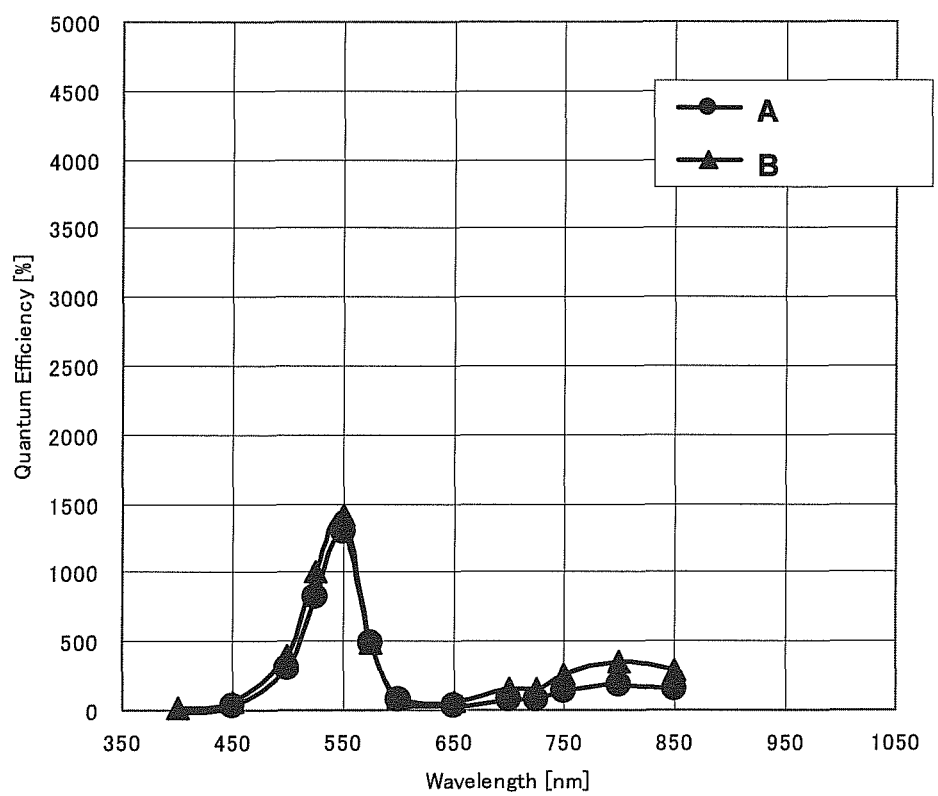
Figure 13C:
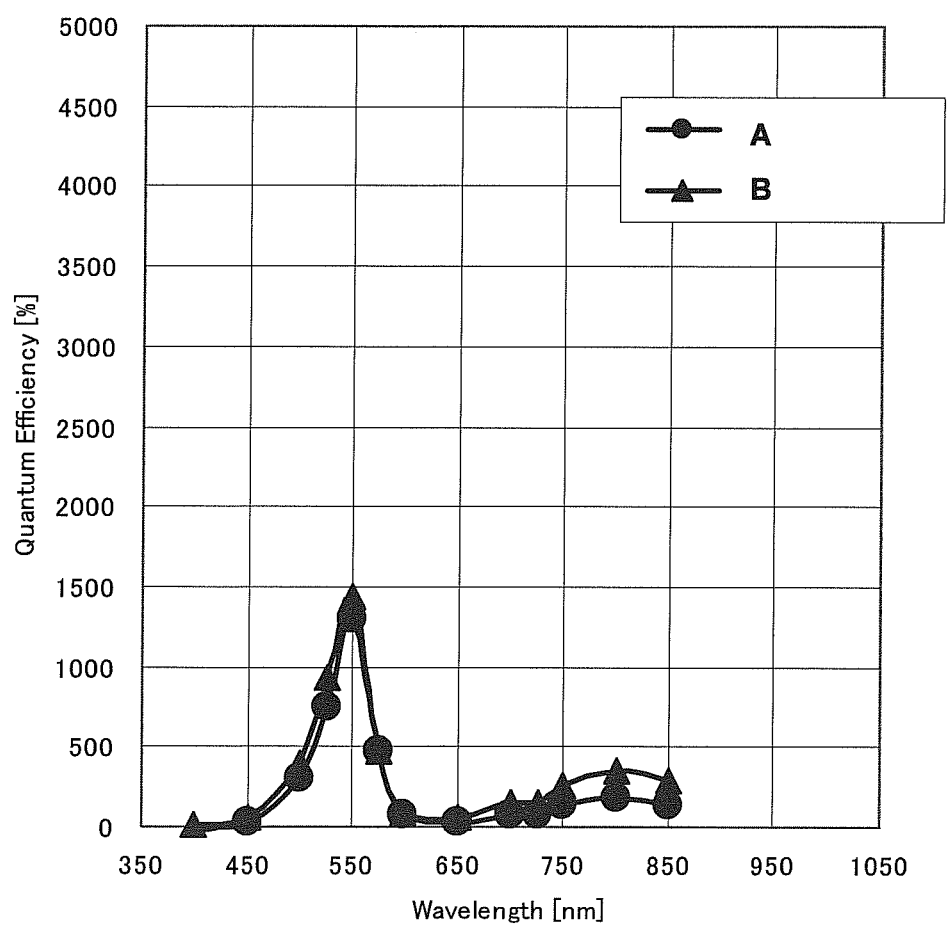

FIG. 13A is an illustration of an exemplary graph showing spectral characteristics of the natural leaf and the artificial plant when the light emitted from the first light source is transmitted while the infrared ray cut filter IRCF is not mounted. FIG. 13B is an illustration of an exemplary graph showing spectral characteristics of the natural leaf and the artificial plant when the light emitted from the second light source is transmitted while the infrared ray cut filter IRCF is not mounted. FIG. 13C is an illustration of an exemplary graph showing spectral characteristics of the natural leaf and the artificial plant when the light emitted from the third light source is transmitted while the infrared ray cut filter IRCF is not mounted.

In FIGS. 13A to 13C, a horizontal axis indicates a wavelength, and a vertical axis indicates quantum efficiency. As illustrated in FIGS. 13A to 13C, because the amount of the infrared ray varies depending on the light source, the artificial leaf differs from the natural leaf according to the light source.

As illustrated in FIGS. 13A to 13C, the infrared light quantity tends to be increased when the color temperature is low like the first light source. The color remains approximately the same to human eyes in an environment such as the high color temperatures of the second light source of FIG. 13B or the third light source of FIG. 13C, while the color is changed in an environment such as the low color temperatures of FIG. 13A.

Figure 14:
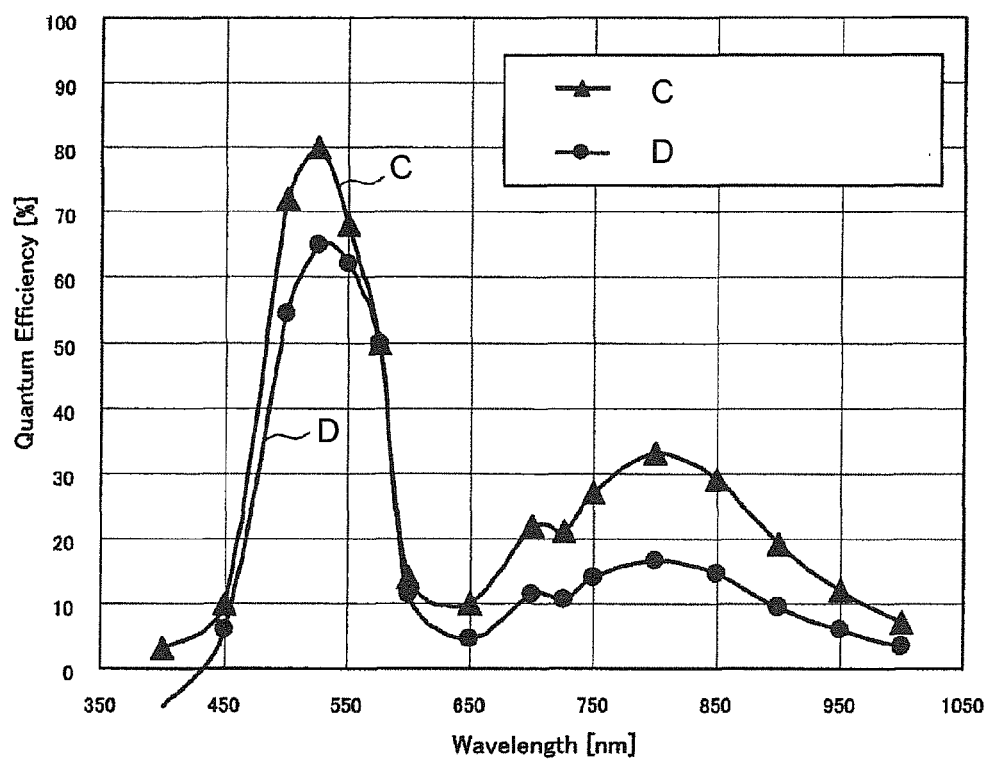
FIG. 14 is an illustration of an exemplary graph showing a spectral characteristic of green that is of the second color obtained from the complementary color, and green that is of the first color transmitted through the green filter when the gain is not adjusted.

FIG. 14 is an illustration of an exemplary graph showing spectral characteristics of a primary color of green (first color) transmitted through the green filter and a computed primary color of green (second color) computed from the complementary colors when the gain is not adjusted. A correction similar to that for green can be performed for red and blue. In FIG. 14, a horizontal axis indicates a wavelength, and a vertical axis indicates quantum efficiency. In FIG. 14, a curve C shows the spectral characteristic of the first color, and a curve D shows the spectral characteristic of the second color.

For example, the second color can be obtained as follows: the second color can be obtained by equation (1) shown below when the first color is green; the second color can be obtained by equation (2) shown below when the first color is red, and the second color can be obtained by equation (3) shown below when the first color is blue. In the equations 1-3, G represents green, R represents red, B represents blue, Cy represents cyan, Mg represents magenta, and Ye represents yellow.

$$G=(Cy+Ye-Mg)/2 \quad (1)$$

$$R=(Ye+Mg-Cy)/2 \quad (2)$$

$$B=(Mg+Cy-Ye)/2 \quad (3)$$

Figure 15:
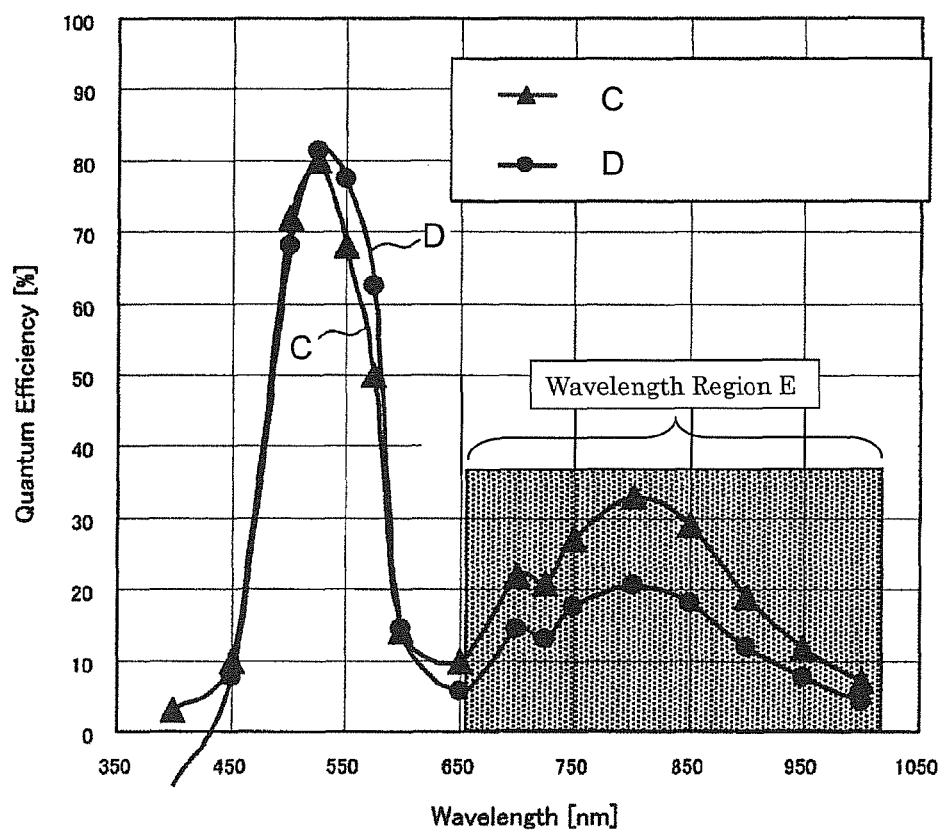
FIG. 15 is an illustration of an exemplary graph showing a spectral characteristic of green that is of the second color obtained from the complementary color, and green that is of the first color transmitted through the green filter when the gain is adjusted according to an embodiment of the present invention.

FIG. 15 illustrates a spectral characteristic of green that is of the second color obtained from the complementary color (computed primary color), and green that is of the first color (transmitted primary color) transmitted through the green filter PCFLT (FIG. 3) when the gain is adjusted according to an embodiment of the present invention. That is, the gain of the curve D in FIG. 14 is adjusted such that an area of the curve D in the visible region of FIG. 14 is made equal to an area of the curve C in the visible region of FIG. 14 and the result is shown in FIG. 15. Alternatively, the gain may be adjusted such that substantially maximum peak heights are equal.

In FIG. 15, a horizontal axis indicates a wavelength, and a vertical axis indicates quantum efficiency. In FIG. 15, a curve C shows the spectral characteristic of green that is of the first color, and a curve D shows the spectral characteristic of green that is of the second color.

As can be seen from FIG. 15, when the spectral characteristic falls within the human luminosity region according to the light source and the reflectivity characteristic of an object, it is necessary that green computed from the complementary color (second color) and the green transmitted through the green color filter PCFLT (first color) have substantially identical signals.

When the spectral characteristic comprises infrared light rays, there is a difference between the computed primary color (second color) such as the computed green and the transmitted primary color such as the transmitted green (first color) in a wavelength region E shown in FIG. 15. Therefore, the computed green differs from the transmitted green in an output value.

The amount of the infrared light rays present in the spectral characteristic is increased with an increasing difference between the computed green and the transmitted green. The amount of the infrared ray present in the spectral characteristic is estimated by the signal difference to perform the color correction.

The reason the color correction is performed is that the image pickup device receives the light out of the luminosity region to change the color unless the infrared ray cut filter IRCF is mounted on the image pickup device.

A color reproduction operation of the image pickup apparatus 10 is described below.

Figure 16:
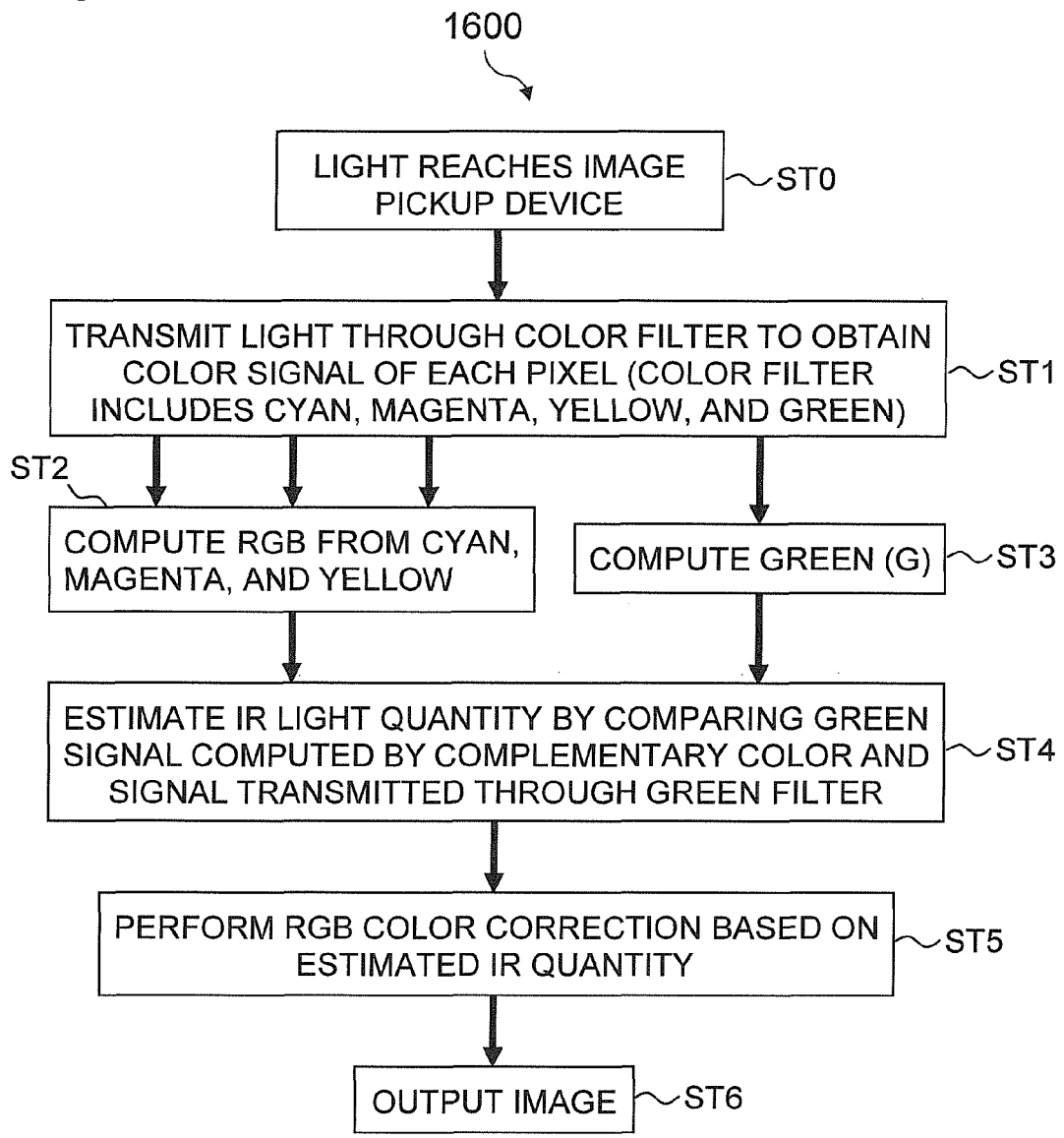
FIG. 16 is an illustration a flow diagram showing an exemplary process for a correction after light reaches an image pickup device through a group of color filters according to an embodiment of the invention.

FIG. 16 is an illustration of a flow diagram showing an exemplary process 1600 for a correction after the light reaches the image pickup device 12 through the group of color filters 13 according an embodiment of the present invention. The various tasks performed in connection with process 1600 may be performed by software, hardware, firmware, a computer-readable medium having computer executable instructions for performing the process method, or any combination thereof. The process 1600 may be recorded in a computer-readable medium such as a semiconductor memory, a magnetic disk, an optical disk, and the like, and can be accessed and executed, for example, by a computer CPU in which the computer-readable medium is stored. It should be appreciated that process 1600 may include any number of additional or alternative tasks, the tasks shown in FIG. 16 need not be performed in the illustrated order, and process 1600 may be incorporated into a more comprehensive procedure or process having additional functionality not described in detail herein. For illustrative purposes, the following description of process 1600 may refer to elements mentioned above in connection with FIGS. 1-15. In practical embodiments, portions of process 1600 may be performed by different elements of the image pickup apparatus 10, for correcting colors, e.g., the image pickup device 12, the group of color filters 13, the color processing unit 14, etc. Process 1600 shows an exemplary operation in the case of the image pickup device 12 having the configuration of FIG. 3 with the complementary color filter having the characteristic of FIG. 5.

Process 1600 may begin by light reaching the image pickup device 12 (Task ST0). The light is then transmitted through color filters to obtain color signal of each pixel (task ST1). For example, when the group of color filters of FIG. 3 is used, the light is transmitted through the cyan filter CFLT, the magenta filter MFLT, the yellow filter YFLT, and the green filter GFLT (complementary color filter CCFLT), and the color signal of each pixel is supplied as a digital signal to the color processing unit 14.

The infrared light quantity estimating unit 142 of the color processing unit 14 computes RGB components from the color signals obtained by transmitting the light through the cyan filter CFLT, the magenta filter MFLT, and the yellow filter YFLT, which are of the complementary color filters (Task ST2). For example, a signal of a computed primary color (second color) such as a green signal is computed using the complementary colors.

The infrared light quantity estimating unit 142 obtains a green component transmitted through the green filter GFLT as the first color (transmitted primary color) (Task ST3).

The infrared light quantity estimating unit 142 then compares the computed primary color computed from the cyan (Cy), magenta (Mg), and yellow (Ye) color signals in the complementary color filters with the transmitted primary color (first color) transmitted through the green filter GFLT, thereby estimating the infrared light quantity of the incident light (Task ST4).

The image processing unit 143 performs the RGB color correction based on the estimated infrared light quantity (Task ST5), and the image processing unit 143 outputs the corrected image to a subsequent signal processing system (Task ST6).

As mentioned above, the image pickup apparatus 10 comprises the color filters of at least four colors. The color signal of the second color computed from at least two colors, and the color signal of the first color transmitted through the color filter having the wavelength region equal to that of the computed signal are obtained and compared to each other (compared signals) in the color processing unit 14.

The infrared light quantity estimating unit 142 of the color processing unit 14 determines that the infrared light quantity is large in the incident light, if the difference between the compared signals is increased, and determines that the influential incident light quantity is not present in the incident light, if the difference between the compared signals is decreased.

The infrared light quantity estimating unit 142 feeds the infrared light quantity estimation result back to the color correction of the image processing unit 143.

As mentioned above, color filters having various color pixels are used in which at least one color can be obtained (second color) by combining other colors. In this manner, a color signal of the first color transmitted through a single pixel is compared with a color signal of the second color computed from the various color pixels to determine the infrared light quantity, thereby enabling the high-sensitivity color reproduction without providing the infrared ray cut filter.

Therefore, high-sensitivity photography can be performed during the darkness hours such as nighttime without providing a mechanism that inserts and extracts the infrared ray cut filter in and from the optical path, the correction amount can be estimated more precisely so as to be matched with the human luminosity characteristic, and therefore the color reproducibility can be improved during the bright hours such as daytime.

In this way, an image pickup device that is matched with the human luminosity characteristic can be implemented without providing a drive unit that moves the infrared ray cut filter from an optical path.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being included within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An image pickup apparatus comprising:
a group of color filters comprising a plurality of colors, the group of color filters comprising a first color filter comprising a first color having a first spectral characteristic;
an image pickup device operable to output a plurality of color signals corresponding to light transmitted through each color filter in the group of color filters respectively, the color signals comprising a first color signal corresponding to the first color filter; and
a color processing unit operable to:
combine the color signals excluding the first color signal to obtain a second color signal having a second spectral characteristic substantially equal to the first spectral characteristic in a visible region; and
adjust a gain of the second color signal such that the first color signal and the second color signal are substantially matched with each other in a visible region; and
compare the first color signal to the second color signal to obtain incident light quantities in near-infrared and infrared regions.

2. The image pickup apparatus according to claim 1, wherein the group of color filters comprises four color filters each corresponding to different colors from each other.

3. The image pickup apparatus according to claim 2, wherein the group of color filters are arranged in a 2-by-2 matrix shape on a pixel array of the image pickup device.

4. The image pickup apparatus according to claim 1, wherein:
the group of color filters comprises cyan, magenta, and yellow color filters; and
the color filter of the first color is one of red, green, and blue color filters.

5. The image pickup apparatus according to claim 1, wherein:
the group of color filters comprises red, green, and blue color filters; and
the color filter of the first color is one of cyan, magenta, and yellow color filters.

6. The image pickup apparatus according to claim 1, wherein the color processing unit is further operable to calculate the incident light quantities in the near-infrared and infrared regions by computing a difference or a ratio between a component of the first color and a component of the second color.

7. A method for correcting infrared light comprising:
generating a first color signal corresponding to light received through a first color filter, the first color signal having a first spectral characteristic;
computing a second color signal by combining color signals of light transmitted through at least two color filters which are different from the first color filter;
performing a correction to the second color signal by adjusting a gain of the second color signal to obtain a corrected second color signal having a second spectral characteristic substantially equal to the first spectral characteristic in a visible region; and estimating an incident light quantity in an infrared region by comparing the first color signal and the corrected second color signal.

8. The method according to claim 7, wherein the first color filter and the at least two color filters comprise four color filters each corresponding to different colors from each other.

9. The method according to claim 8, wherein the four color filters are arranged in a 2-by-2 matrix shape on a pixel array of an image pickup device.

10. The method according to claim 8, wherein:
the four color filters comprise cyan, magenta, and yellow color filters; and
the first color filter is one of red, green, and blue color filters.

11. The method according to claim 8, wherein:
the four color filters comprises red, green, and blue color filters; and
the first color filter is one of cyan, magenta, and yellow color filters.

12. An imaging method, comprising:
receiving a plurality of light rays transmitted through a group of color filters comprising a first color filter of a first color having a first spectral characteristic;
generating a plurality of color signals corresponding to the light rays transmitted through the group of color filters respectively, the color signals comprising a first color signal corresponding to first light rays transmitted through the first color filter;
computing a second color signal by combining at least two color signals corresponding to light rays transmitted through at least two color filters that are different from the first color filter;
performing a correction to the second color signal by adiusting a gain of the second color signal to obtain a corrected second color having a second spectral characteristic substantially equal to the first spectral characteristic in a visible region; and
estimating incident light quantities in near-infrared and infrared regions by comparing the first color signal and the corrected second color signal.

13. The imaging method according to claim 12, wherein the at least two color filters comprise four color filters each corresponding to different colors from each other.

14. The imaging method according to claim 13, wherein the four color filters are arranged in a 2-by-2 matrix shape on a pixel array of the image pickup device.

15. The imaging method according to claim 13, wherein:
the four color filters comprise cyan, magenta, and yellow color filters; and
the first color filter is one of red, green, and blue color filters.

16. The imaging method according to claim 13, wherein:
the four color filters comprise red, green, and blue color filters; and
the first color filter is one of cyan, magenta, and yellow color filters.

* * * * *